US011343659B2

(12) United States Patent
Meijers et al.

(10) Patent No.: US 11,343,659 B2
(45) Date of Patent: May 24, 2022

(54) DIFFERENTIATED SERVICE OFFERINGS BASED ON A GEOLOCATION

(71) Applicant: Kymeta Corporation, Redmond, WA (US)

(72) Inventors: Neville Meijers, Kirkland, WA (US); Paul Klassen, Newcastle, WA (US); Troy Terry, Kirkland, WA (US); Benjamin Posthuma, Kirkland, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 16/823,067

(22) Filed: Mar. 18, 2020

(65) Prior Publication Data

US 2020/0304971 A1 Sep. 24, 2020

Related U.S. Application Data

(60) Provisional application No. 62/822,645, filed on Mar. 22, 2019.

(51) Int. Cl.
*H04W 24/00* (2009.01)
*H04W 4/50* (2018.01)
(Continued)

(52) U.S. Cl.
CPC ............ *H04W 4/50* (2018.02); *H04W 4/021* (2013.01); *H04W 4/12* (2013.01); *H04W 4/24* (2013.01);
(Continued)

(58) Field of Classification Search
CPC ..... H04W 4/50; H04W 64/006; H04W 4/021; H04W 4/90; H04W 8/245; H04W 28/22;
(Continued)

(56) References Cited

U.S. PATENT DOCUMENTS 7,848,765 B2   12/2010   Phillips et al.
8,599,003 B2   12/2013   Roberts, Sr. et al.
(Continued)

OTHER PUBLICATIONS

International Search Report for Application No. PCT/US2020/023731 dated Jul. 6, 2020, 11 pages.
(Continued)

*Primary Examiner* — Huy C Ho
(74) *Attorney, Agent, or Firm* — Womble Bond Dickinson (US) LLP

(57) ABSTRACT

A method and apparatus for differentiated service offerings based on a geo-location are disclosed. In one embodiment, the method comprises: receiving geo-location information from a plurality of remote devices; generating one or more events in response to determining that the geo-location information for each remote device of the plurality of remote devices indicates that said each remote device has entered or exited one of a set of one or more geo-fences; and triggering an action with respect to said each remote device, the action for managing at least one service for said each remote device based on geo-location of the one or more remotes, including determining a level of service and/or type of service for said each remote based on its respective geo-location.

26 Claims, 7 Drawing Sheets

(51) Int. Cl.
*H04W 64/00* (2009.01)
*H04W 4/021* (2018.01)
*H04W 4/90* (2018.01)
*H04W 4/12* (2009.01)
*H04W 28/22* (2009.01)
*H04W 8/18* (2009.01)
*H04W 4/24* (2018.01)
*H04W 8/24* (2009.01)
*H04W 28/24* (2009.01)
*H04W 88/06* (2009.01)

(52) U.S. Cl.
CPC ............ *H04W 4/90* (2018.02); *H04W 8/186* (2013.01); *H04W 8/245* (2013.01); *H04W 28/22* (2013.01); *H04W 64/006* (2013.01); *H04W 28/24* (2013.01); *H04W 88/06* (2013.01)

(58) Field of Classification Search
CPC ......... H04W 8/186; H04W 4/24; H04W 4/12; H04W 88/06; H04W 4/02; H04W 4/023; H04W 4/024; H04W 4/025; H04W 4/026; H04W 4/027; H04W 4/029; H04W 4/06; H04W 4/08; H04W 4/14; H04W 76/50; H04W 84/08
USPC ...................................................... 455/456.3
See application file for complete search history.

(56) References Cited

U.S. PATENT DOCUMENTS

| | | |
|---|---|---|
| 2013/0018572 A1 | 1/2013 | Jang |
| 2013/0203442 A1 | 8/2013 | Leblane et al. |
| 2016/0055475 A1* | 2/2016 | Nuzzi ................ G06Q 20/3224 705/40 |
| 2016/0192166 A1* | 6/2016 | deCharms ............... H04L 67/18 348/14.02 |

OTHER PUBLICATIONS

International Preliminary Report on the Patentability of Application No. PCT/US2020/023731 dated Oct. 7, 2021, 7 pages.

* cited by examiner

DIFFERENTIATED SERVICE OFFERINGS BASED ON A GEOLOCATION

PRIORITY

The present application is a continuation of and claims the benefit of U.S. Provisional Patent Application No. 62/822,645, filed on Mar. 22, 2019 and entitled "DIFFERENTIATED SERVICE OFFERINGS BASED ON A GEO-LOCATION", and is incorporated by reference in its entirety.

FIELD OF THE INVENTION

Embodiments of the present invention are related to provisioning and deprovisioning of communication services; more particularly, embodiments of the present invention are related to managing services and/or service levels of remote devices in a network based on their geo-location.

BACKGROUND OF THE INVENTION

Wildfire agencies and first responders have a number of problems when it comes to communications utilized by their fleets. For example, wildfire agencies currently have no way to configure communication services on-demand for their engine crew. These agencies must equip their entire fleet with communication services and pay for the services yearly or monthly depending on which communication services are enabled.

First responder agencies are challenged with communications outside areas with cellular coverage. They have a similar problem to wildfire agencies in that they can't pay for both cellular connectivity and satellite connectivity. They need a way to pay for what they use and configure the fleet dynamically based on emergent events.

When engine crews or first responders acquire a service within a particular area, they are typically taken away once they leave the that area. This is problematic in the event that they are leveraging real-time services that depend on VoIP, SIP, H.323 protocols. Specifically, where the call could be interrupted or dropped when the actor leaves the area, a problem may occur.

As the functions of wildfire agencies and first responders are critical to the safety of others and themselves, solutions to these problems are necessary.

SUMMARY OF THE INVENTION

A method and apparatus for differentiated service offerings based on a geo-location are disclosed. In one embodiment, the method comprises: receiving geo-location information from a plurality of remote devices; generating one or more events in response to determining that the geo-location information for each remote device of the plurality of remote devices indicates that said each remote device has entered or exited one of a set of one or more geo-fences; and triggering an action with respect to said each remote device, the action for managing at least one service for said each remote device based on geo-location of the one or more remotes, including determining a level of service and/or type of service for said each remote based on its respective geo-location. In one embodiment, being based on its respective geo-location includes directionality of movement across a geo-fence, as this allows instrumenting slow degradation of extra services (e.g., allowing a user to finish a call (e.g., a vide call) after exiting a high-privilege zone before removing that capability, etc.).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
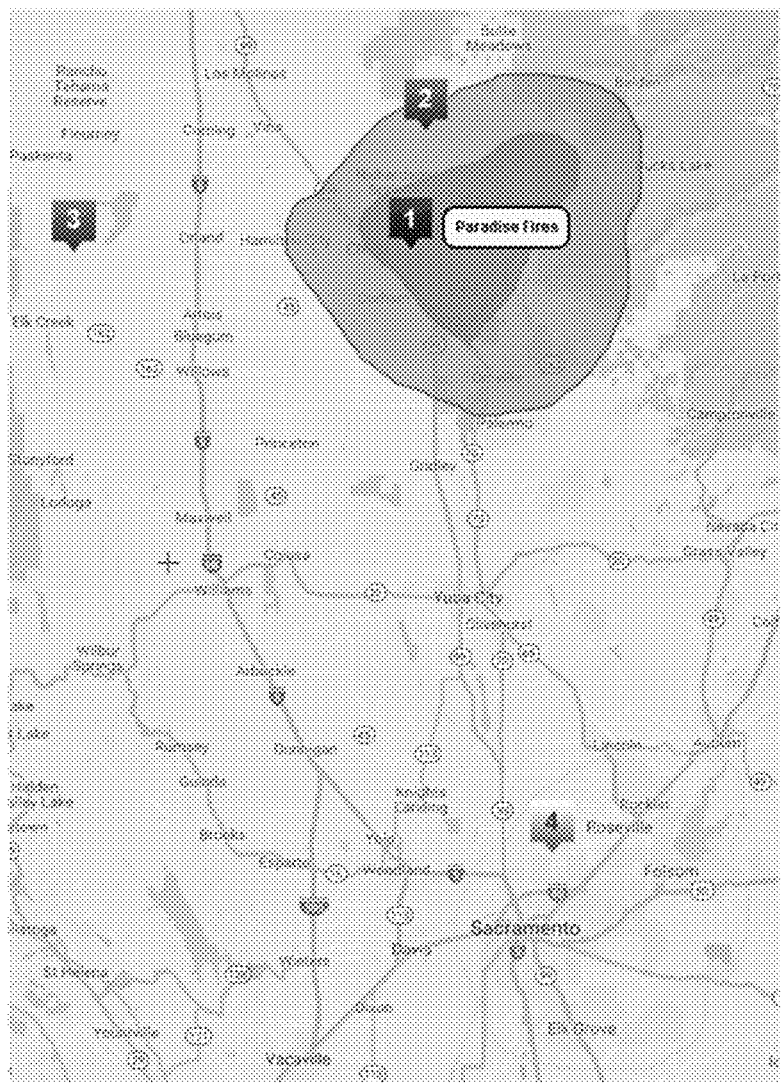
FIG. 1 illustrates a set of example geo-fenced zones.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A system and method for provisioning, pricing, establishing policies, and managing communication services based on geo-location are described. In one embodiment, a differentiated service offering can be made with respect to one or more of provisioning, pricing and managing communication services (e.g., wireless services) for remote devices within geo-fences (e.g., geo-spatial locations). That is, based on the geographic zone of a user (e.g., remote device (e.g., terminal)), the system determines the level of service and types of service that may be made available to the user. In one embodiment, the system can provision and de-provision services based on the geo-spatial area in which a remote device resides. In other words, the system de-provisions and provisions new types of service when a remote device enters and/or leaves a particular geographic zone. Furthermore, in one embodiment, the system can operate based on priorities that have been set based on conditions in the geo-spatial area.

In one embodiment, the system acts as a virtual service operator provider to provide satellite and cellular services and can provision (and deprovision) nodes (e.g., remote devices) in the network dynamically for different services or service levels. In this case, the system comprises a software system for controlling services and service levels for remote devices, including their provisioning and deprovisioning based on their geo-location. Thus, the system performs per-node provisioning. In one embodiment, the system provisions each node with nominal services for normal operations and when high throughput/priority needed, the system provisions individual nodes with high throughput/priority services. This is advantageous in a number of situations. For example, in emergency situations (e.g., first responders) where it is necessary to prioritize communications for fleets depending on the type of event that is occurring (e.g., a fire, flood, etc.). In this case, the system is able to dynamically provide and enable upgraded services if necessary. Note this can be done manually or automatically.

Thus, novel techniques are described herein for a software system for location-based communication services, such as, for example, satellite and cellular services. Embodiments of the system have one or more of a number of features, some of which are described below.

First, in one embodiment, the system performs alerting, based on predefined criteria. For example, in one embodiment, when vehicle enters a geo-fence, the system sends a communication and/or takes some action. The communication that is sent by the system may comprise an email or SMS message. In one embodiment, the action the system may take comprises a call to another system's web service. This may be particularly useful in cases where a party (e.g., company, individual, etc.) has a system that performs geo-location-aware processing specifically designed to implement its own policy. In such cases, the system calls another system's web service, which in response thereto, performs one or more actions. In one embodiment, the system may call a 3PP web service with a notification (e.g., "Device X has entered geo-zone Y."), and in response thereto, the 3PP web service may take one or more preprogrammed actions Second, in one embodiment, the system is able to perform configurations of terminals based on the geo-fence location in which they currently reside. For example, in one embodiment, the system increases remote device (e.g., terminal) throughput when entering a particular geo-fence and decreases the remote device (e.g., terminal) throughput when leaving that geo-fence.

Third, in one embodiment, the system provides variable pricing based on a geo-fencing structure. Thus, the pricing of communication services changes based on the geo-fenced location of the remote device (e.g., terminal).

Fourth, in one embodiment, the system is able to configure a fleet of terminals and geo-fence based on category and grouping. For example, in the case of first responders, a group of vehicle types of one type, such as, Wildland Engine Type 3, 4, 5, 6, 7, can be configured in the same manner with a certain set of provisioned services.

Fifth, in one embodiment, the system enables and restricts services (e.g., high-throughput) based on geo-fence area. For example, in one embodiment, one or more terminals are provisioned to use both satellite and cellular services while in a geo-fence area and only cellular when outside area.

Sixth, in one embodiment, the system provides for smart hybrid quality-of-service (QoS). In one embodiment, for example, when a device (e.g., terminal) is leaving one geo-fenced while handling Class 5 call/skype/video calls, the system will not change the service level until the Class 5 call is concluded. Thus, the system is able to control the provisioning and de-provisioning of services when different geo-fenced areas are entered and exited to ensure calls are not dropped.

Seventh, also related to QoS-based policies, in one embodiment, the system uses one or more geo-sensitive policies to override other policies if the device is in a specified area. For example, in one embodiment, a standard policy of QoS throttling in a usage overage scenario is overridden by a geo-sensitive policy (e.g., in an emergency zone, there is no enforcement of overage-based throttling)".

Eighth, in one embodiment, also related to QoS-based policies, in one embodiment, the system uses one or more geo-sensitive policies to cause changes to message priorities when geo-fenced areas are entered or exited. For example, if a device enters a defined geo-zone such as, for example, a burning building, the system uses a geo-sensitive policy to enable the device to receive messages with automated message priority over those devices and/or operators outside of the geo-zone.

Ninth, in one embodiment, the system uses one or more geo-sensitive policies to cause automatic deployment of software modules. For example, if a user of a device is from an agency and the device enters into a geo-zone (e.g., an incident area), in one embodiment, under such a geo-sensitive policy, the system automatically deploys software assets that are being used in that geo-zone, along with credentials (e.g., Situational Awareness (SA) software, communications software, etc.) to enable visiting users to automatically be in concert with the other incident users.

Embodiments disclosed herein have one or more of a number of the following innovations. First, embodiments of the system provide a smart configuration based on geo-fenced area. That is, the system can configure device (e.g., terminal) in such a way that when a device (e.g., terminal) is entering/exiting a certain area while on call, the provisioning and/or de-provisioning of a terminal is controlled to maintain the call. Thus, the system is able to configure a device (e.g., terminal) in the system to be hybrid to provision satellite versus cellular based on the environment. In other words, bidirectional configuration during egress and ingress events is facilitated by the system. Second, embodiments of the system include hybrid service enablement, with high-throughput or throughput control defined by a geo-fenced area. Third, embodiments of the system include smart hybrid QoS (e.g., Class 5 service persistence until session completion for call/skype/video calls). Fourth, embodiments of the system are able to provide variable pricing based on geo-fenced area and service enablement.

Embodiments are particularly useful for managing classification, category, and grouping of fleets, such as, for example, fleets of police, fire, and first responders used by municipalities.

Embodiments disclosed herein include a number of improvements. As a first example, in one embodiment, embodiments of the system perform alerting, based on defined criteria. For example, the system can assign actions to egress/ingress events for specific geo-fence areas or layered geo-fence areas. As a second example, the system can perform actions based on any feature available to the system including, but not limited to, email, SNMP trap, SMS or RESTful events.

In one embodiment, core elements of the system in one or more embodiments are:

1. Geo-Events: Movement of actors (remote units, vehicles, people or devices) within the geo-fence triggers events within the system. Events can trigger actions based on the rules defined by the system-level features. Examples of trigger events include a device (e.g., terminal) leaving one area (e.g., a car moves out of a jurisdiction) and sending a notification to the control system or vice versa).

2. Geo-fence: geographic coordinates drawn using geo-polylines represented by longitude and latitude coordinate points to define a spatial area.

3. Smart QoS (Quality of Service): enables throughput management, packet priority and/or latency restrictions supporting service level dependent protocols (e.g., VoIP, SIP, H.323)

By combining these core elements, a unique blend of technology not currently available in the market is created, in which geo-events are leveraged to change service levels dynamically for multiple fleet actors as they move in and out of the geo-fences and variable pricing for services can be made available based on the location and services of the device (e.g., terminal). Additionally, in one embodiment, geo-fences are layered for specific types of service combinations in overlap regions. For example, in a first-responder scenario in which there is a fire, geo-fences can be established as concentric polygons around the center of the fire. As a device travels from the outside the fire zone and passes into each "deeper" zone, the policy dictates that the system take more and more restrictions away from the service(s) and/or service level(s). Thus, under one or more policies, in an outermost zone, the system removes simple overage penalties; in the next inner zone, the system turns on hybrid satellite/cell service; and in innermost zone, the system greatly increases QoS.

A generic geo-fenced services framework is described that allows for limitless use cases of on-demand services, enabling variable pricing, throughput on-demand, Smart QoS, Geo-fence Events and more.

Embodiments of the present invention solve one or more problems described above. For example, with respect to wildfire agencies currently having no way to configure communication services on-demand for their engine crews, the techniques described herein enable providing tiers of services on-demand, embodiments of the system described herein can overcome this problem. Wildfire agencies can define a set of services in a geo-fenced area of a forest fire. Any fleet actors within the geo-fence are automatically configured with the services define while they are in the geo-fenced area. By enabling actors within the geo-fence, the wildfire agencies pay only for elevated services for actors fighting the fire. Resulting in tight communication between engine crews and ultimately saving lives.

As another example, with respect to first responder agencies being challenged with communications outside areas with cellular coverage and having to pay for both cellular connectivity and satellite connectivity, embodiments of the system described herein allow first responder agencies to dynamically configure services for the first responders only in a geo-fenced area. By configuring satellite and cellular services to deliver specific types of services to the actors within the geo-fence, the first responder agencies pay only for what they use, and anytime an actor leaves the geo-fence, the services can be turned off.

Lastly, with respect to engine crews or first responders being able to keep a service only when they are within a geo-fence, embodiments of the system described herein monitor the types of services acquired within a geo-fence and follow QoS protocol rules to ensure service is maintained while the actor leaves the geo-fenced area for specific period/timeout. This will allow for the actor to complete a call or SIP activity before the deprovisioning of the service is enacted by the geo-fence rules.

Geo-fences may be set up for various regions and for various purposes. The techniques disclosed herein are not limited to the type of region or purpose for setting up a geo-fence.

FIG. 1 illustrates are set of examples numbered 1-4, describing example geo-fenced zones. These include the following:

1. Paradise Fires Hot Zone 1: The primary area of the fires, most of the firefighting took place here. In this example the geo-fence enables hybrid satellite and cellular services with high communication throughput. Enabling smart QoS features allows for engine crews to go in and out of zone 1 while maintaining communication links. Alerting the fleet on zone changes per engine crew.
2. Paradise Fires Setback Zone 2: Used for disaster awareness alerting, engine crew preparations and triage. In this example, the geo-fence enables hybrid satellite and cellular services with medium communication throughput. Enabling smart QoS features allows for engine crews to go in and out of zone 1 while maintaining communication links. Embodiments of the system described herein also alert the fleet of zone changes per engine crew.
3. Generic Zone 3: Used for all engine crews and first responders. Geo-fence-based provisioning described herein enables cellular services only with medium throughput.
4. Sacramento Police Zone 4: Enabled for multi-cellular carrier support. All actors within this geo-fence-based provisioning send periodic beacon pings, and any ping that doesn't come back in allotted timeout is marked as last known location with off-line state. Anytime an actor leaves or enters a geo-fence area, the system sends an alert to agency headquarters and nearby actors.

Figure 2A:
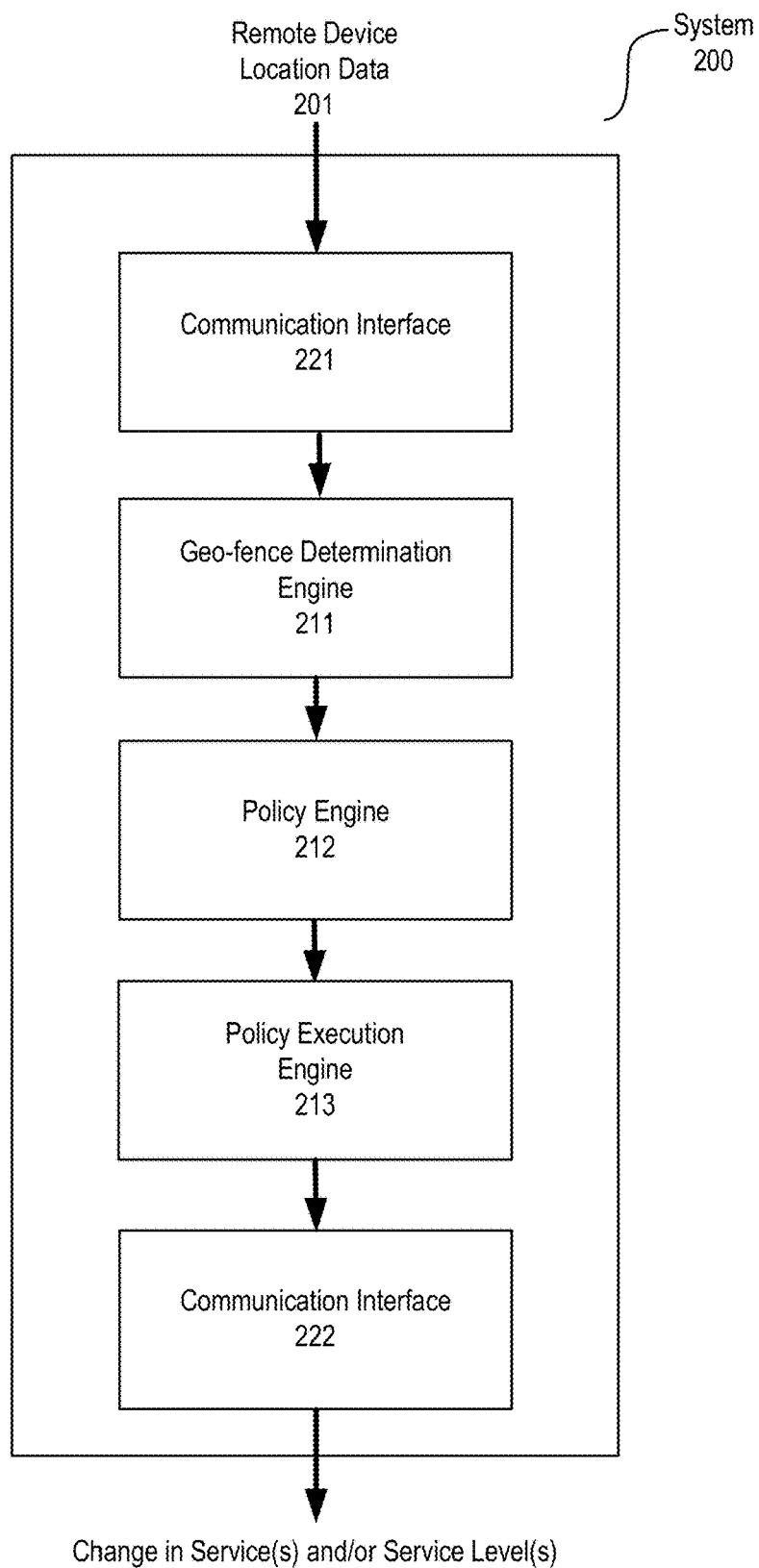
FIG. 2A illustrates a block diagram of a system that manages communication services and service levels for remote devices in a network.

FIG. 2A illustrates a block diagram of a system that performs the operations described above. In one embodiment, the system comprises processing logic that may comprise hardware (circuitry, dedicated logic, etc.), software (such as is run on a general-purpose computer system or a dedicated machine), or a combination of both.

Referring to FIG. 2A, system 200 includes a communication interface 221 to receive remote device location data 201 from one or more remote devices. In one embodiment, communication interface 221 comprises a wireless communication interface to receive communications wirelessly from the remote devices. For example, communication interface 221 may comprise one or both of a cellular communication interface and a satellite communication interface. However, the techniques disclosed herein are not limited to satellite and cellular communication interfaces and can include, for example, but not limited to, Wi-Fi, local mesh networking, etc. In another embodiment, communication interface 221 is a wired communication interface to receive remote device location data 201 over wired communication. In one embodiment, in such a case, remote device location data 201 is received from the remote devices by one or more other systems and forwarded to system 200. In one embodiment, remote device location data 201 is based on global position system (GPS) data obtained from a GPS sensor on or in proximity to the remote device. Note that in alternative embodiments, remote device location data 201 is derived from one or more other sources of location information associated with the remote device.

In one embodiment, remote device location data 201 comprises geo-location data of a remote device and the identifier (ID) of the remote device to enable system to determine the remote device that sent the geo-location data.

Remote device location data 201 is forwarded to a geo-fence determination engine 211 that determines whether the geo-location of each remote device that forwarded its location information is within a geo-fence. In one embodiment, geo-fence determination engine 211 comprises a location processor that accesses a geo-polyline database using the geo-location information from each remote device to determine if the remote device is within a region for which a geo-fence has been set up with respect to that remote device. Geo-fence determination engine 211 outputs an event indicating that a remote device is within a region for which a geo-fence has been set up with respect to that remote device. This event is sent to policy engine 212.

In response to an event from geo-fence determination engine 211, policy engine 212 determines the associated service(s) and service level(s) for the remote device for that geo-fence in which it resides. In one embodiment, the associated service(s) and service level(s) for the remote device are based on policies (e.g., sets of rules) related to the associated service(s) and service level(s) that are to be employed by the remote device when in the geo-fence identified by its location information, remaining within a geo-fence, and/or after leaving a geo-fence, where the policies to be employed are different. These policies may specify whether to use cellular or satellite communications at certain times. As an example, when a device enters a forest fire zone, the remote device gets its upgraded service immediately. When the remote device leaves the forest fire zone, the remote device may lose its upgraded service after a given period of time (this is in order to avoid "wobbling" if the remote device is moving around near a zone boundary). As another example, a policy may enable adherence to local laws, and if, for instance it is illegal to use satellite communication in country A, a device entering into country A (as defined by a geo-zone) may need to have its satellite connection temporarily suppressed. Thus, in one embodiment, a policy is defined as to what happens when a zone is entered and/or exited, and the policy and policy execution engine are data-driven to handle the exigency automatically. Other examples are described above.

In one embodiment, in response to the determination by policy engine 212 of the associated service(s) and service level(s) for the remote device for that geo-fence in which it resides, policy engine 212 triggers one or more actions (related to that remote device) to manage the service and/or the level of service for the remote device based on its geo-location. In one embodiment, at least one of the actions is to program the remote device with a new policy by which it is to operate in the geo-fence in which it currently resides. In one embodiment, managing the service and/or the level of service for the remote device comprises changing the configuration of the remote device (e.g., changing the rules by which the remote device operates, etc.) and/or changes to the service and/or service level at the operator (e.g., satellite operator, cellular operator, etc.).

There are a number of ways to manage services and levels of service. For example, in one embodiment, the system dynamically provisions and/or de-provisions services. In another embodiment, the system provides and enables upgraded services. In another embodiment, the system increases remote device (e.g., terminal) throughput when entering a particular geo-fence and decreases the remote device (e.g., terminal) throughput when leaving that geo-fence. In another embodiment, the system obtains variable pricing based on a geo-fencing structure so that the pricing of communication services changes based on the geo-fenced location of the remote device. In one embodiment, the system monitors the types of services acquired within a geo-fence and follows QoS protocol rules to ensure a service is maintained while the actor leaves the geo-fenced area for specific period/timeout, so that a remote device is controlled to maintain the call. In another embodiment, they system configures a device (e.g., terminal) to be a hybrid with bidirectional configuration during egress and ingress events. In another embodiment, they system configures the remote device to include smart hybrid QoS (e.g., Class 5 service persistence until session completion for call/skype/video calls). In another embodiment, the system changes service levels dynamically for multiple fleet actors as they move in and out of the geo-fences and variable pricing for services can be made available based on the location and services of the device (e.g., terminal). In another embodiment, the system enables tiers of services on-demand, thereby enabling actors within the geo-fence, such as, for example, remote devices of the wildfire agencies, to pay only for elevated services for actors fighting the fire. In another embodiment, the system dynamically configures satellite and cellular services for the first responders only in a geo-fenced area to deliver specific types of services to the actors within the geo-fence, such that the first responder agencies pay only for what they use, and anytime an actor leaves the geo-fence, the services can be turned off.

In one embodiment, policy engine 212 comprises an event processor to process events from the geo-fence determination engine 211. In one embodiment, the event processor uses an event rules database to determine the rules, or policy, by which a remote device is to operate for a specified geo-fence. Based on which policy (e.g., set of rules) is identified by the event processor, the event processor identifies the set of one or more actions that are to be taken to manage (e.g., change) the service(s) and/or service level(s) of the remote.

In one embodiment, these actions are sent to policy execution engine 213.

In response to actions from policy engine 212, policy execution engine 213 executes the actions to implement the management of the remote device as specified by the policy engine 212. In one embodiment, policy execution engine 213 comprises an alert processor to generate an alert or notification for the remote device to signal that a change in service or service level is being made. In one embodiment, this alert or notification includes information to cause the remote device to be reconfigured. In another embodiment, the alert indicates to the remote device that configuration information is available and provides instructions the remote device on how to access the configuration information (e.g., download the configuration).

In one embodiment, policy execution engine 213 uses communication interface 222 to communicate with remote devices, satellite operators and cellular operators to implement the changes to services and/or service levels. In one embodiment, the system provides services that include services from 3PP such as satellite and cellular network providers. In one embodiment, policy execution engine 213 embody the functionality necessary to translate a policy into disparate calls to 3PP or directly to the remote device (e.g., terminal).

Figure 2B:
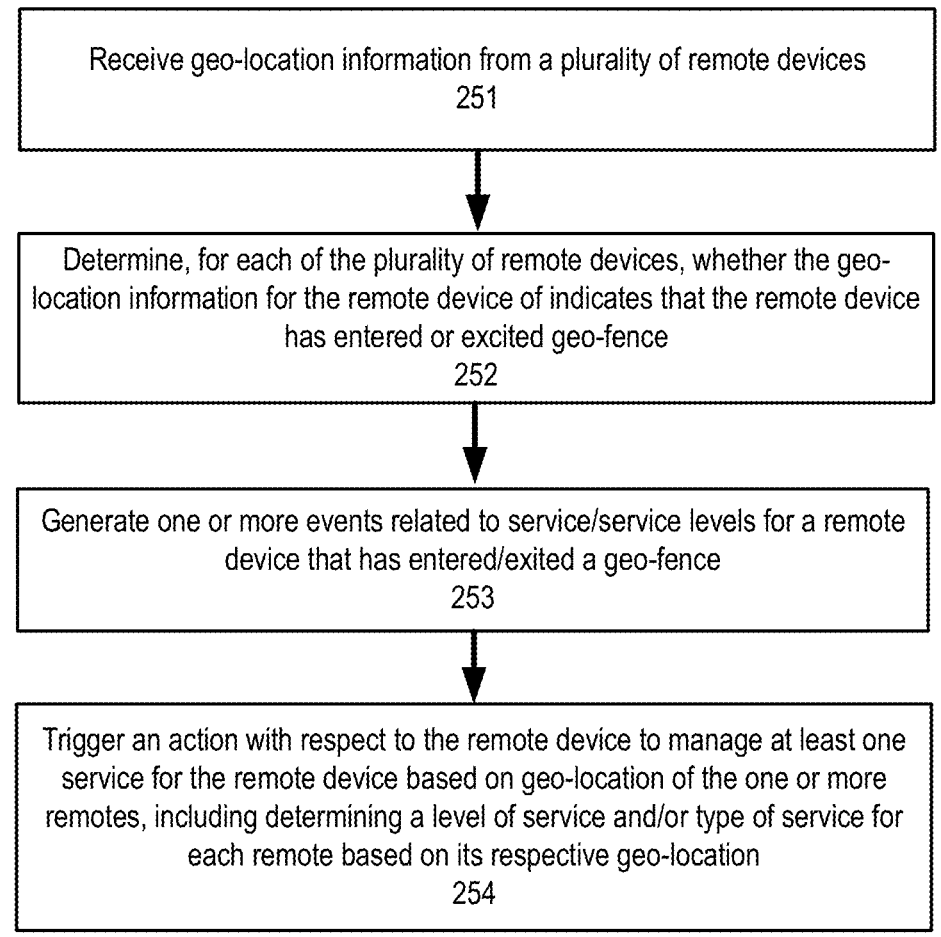
FIG. 2B is a flow diagram of one embodiment of a system managing remote devices based on their geo-location.

FIG. 2B is a flow diagram of one embodiment of a system managing remote devices based on their geo-location. The process is performed by processing logic that may comprise hardware (circuitry, dedicated logic, etc.), software (such as is run on a general-purpose computer system or a dedicated machine), or a combination of both.

Referring to FIG. 2B, the process begins by processing logic receiving geo-location information from a plurality of remote devices (processing block 251). This may be provided at regular intervals of time.

In response to the geo-location information, processing logic determines, for each of the plurality of remote devices, whether the geo-location information for the remote device of indicates that the remote device has entered or excited geo-fence (processing block 252).

Based on the determination, processing logic generates one or more events (processing block 253) and triggers an action with respect to the remote device to manage at least one service for the remote device based on geo-location of the one or more remotes, including determining a level of service and/or type of service for each remote based on its respective geo-location (processing block 254). In one embodiment, being based on its respective geo-location includes directionality of movement across a geo-fence, as this allows instrumenting slow degradation of extra services (e.g., allowing a user to finish a call (e.g., a vide call) after exiting a high-privilege zone before removing that capability, etc.).

In one embodiment, managing the service comprises provisioning or deprovisioning one or more services when the remote device enters or exits a geo-fence. In one embodiment, managing the service of the remote device comprises managing satellite and cellular services for the entire fleet or a set of remote devices that are part of the fleet. In one embodiment, managing the service comprises obtaining different pricing of one or more services of the remote device based on the geo-fence in which the remote device resides.

In one embodiment, managing the service comprises generating an alert for remote device. In one embodiment, the alert comprises an email, SMS/text message, SNMP, RESTful, MQTT, etc. In one embodiment, the remote device obtains the alert using a pull operation. In another embodiment, the alert is pushed to the remote device using a communication channel that is available or currently accessible by the remote device.

In one embodiment, managing the service comprises calling a web service of another system.

In one embodiment, managing the service comprises configuring each said remote device based on the geo-fence in which the remote device resides. In one embodiment, configuring the remote device comprises changing throughput of the remote device based on the geo-fence in which the remote device resides. In one embodiment, one or more of the remote devices are part of a fleet, and configuring the remote device comprises configuring a group of remotes of which the one remote is partly based on category. There are a number of examples of categories. In one embodiment, categories vary per customer, but the idea is that a customer may have several kinds of chassis on which remote devices are placed. In one embodiment, first responder may have ambulances, fire trucks, and command vehicles, and each category of vehicle will have different needs in each zone (e.g., a fire truck and command vehicle may need extra QoS, while an ambulance may need enablement of guest Wi-Fi access). Hence, the customer is able to arbitrarily group his remotes and apply geo-zone policies separately to each group. In one embodiment, the group comprises first responders, police, fire, or emergency personnel. In one embodiment, configuring the remote device comprises controlling provisioning or deprovisioning when the remote device is actively using a communication service to maintain a call that would otherwise be dropped if the provisioning or deprovisioning occurred.

Figure 2C:
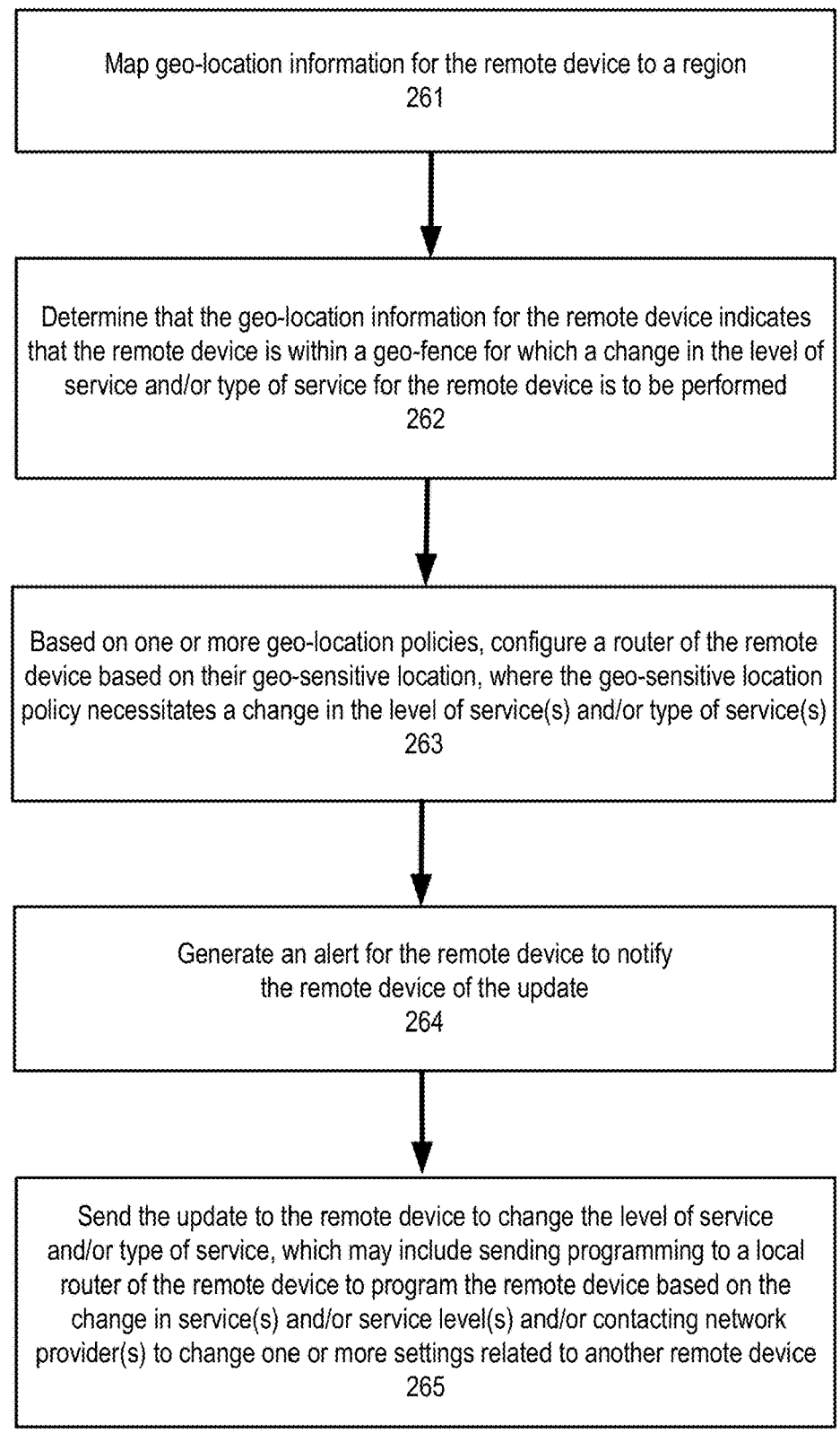
FIG. 2C is a flow diagram of another embodiment of a system managing a remote device based on its geo-location.

FIG. 2C is a flow diagram of another embodiment of a system managing a remote device based on their geo-location. The process is performed by processing logic that may comprise hardware (circuitry, dedicated logic, etc.), software (such as is run on a general-purpose computer system or a dedicated machine), or a combination of both.

Referring to FIG. 2C, the process begins by processing logic mapping geo-location information for the remote device to a region (processing block 261) and determining that the geo-location information for the remote device indicates that the remote device is within a geo-fence for which a change in the level of service and/or type of service for the remote device is to be performed (processing block 262).

Next, processing logic of a policy engine, responsive to one or more geo-sensitive location policies, configures a router of the remote device based on its geo-sensitive location, where each geo-sensitive location policy indicates that a different service or level of service should be used by the remote device, thereby necessitating a change be made (processing block 263).

In one embodiment, processing logic also generates an alert for the remote device to notify the remote device of the update (processing block 264). The alert may be pushed to the remote device or pulled by the remote device. In one embodiment, the remote device performs a pull operation periodically to determine if it has an alerts or other notifications waiting for it. Note that this is optional, and in another embodiment no alert is generated.

Processing logic sends the update to the remote device to change the level of service and/or type of service, including sending programming to a local router of the remote to program the remote device based on the change in service and/or service levels, and/or contacts network providers to change one or more settings related to the remote device (processing block 265). In one embodiment, the change in the level of service and/or type of service comprises ignoring usage limits.

Figure 3:
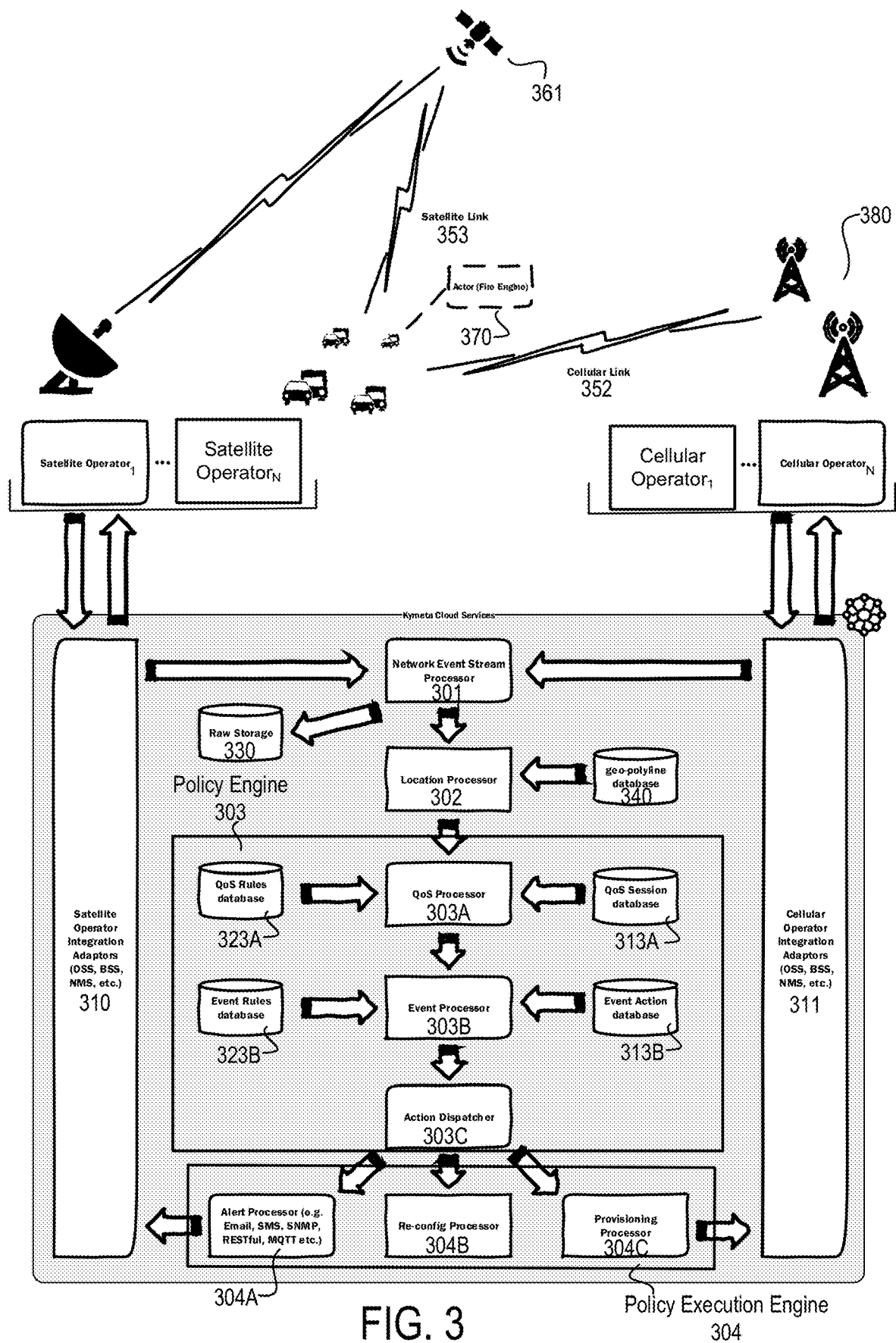
FIG. 3 illustrates a block diagram of a control system for managing the service(s) and/or levels of service(s) for multiple remote devices in a network.

FIG. 3 illustrates the block diagram of a control system for managing the service(s) and/or levels of service(s) for multiple remote devices. Referring to FIG. 3, control system includes a network event stream processor 301 that receives events from service operators, such as, for example, cellular operators 1-N and satellite operators 1-N. The events may include location data from one or more remote devices that use satellite and cellular services from these cellular operators 1-N and satellite operators 1-N. In one embodiment, these remote devices are part of a fleet of remote devices (e.g., vehicles of first responders, vehicles of fire department personnel, vehicles of police personal, etc.), such as, for example, remote device 370. These remote devices utilize satellite links 353 and/or cellular link 352 to communicate with satellite 361 and base stations 380, respectively, as well as provide data to the control system and to receive data from the control system.

In one embodiment, network event stream processor 301 stores event data in raw storage (memory) 330. If the events received by network event stream processor 301 include location data from remote devices, network event stream processor 301 processes location data received from remote devices in the field, such as remote device 370. In one embodiment, network event stream processor 301 processes the location data as described above.

In one embodiment, the location data along with a remote device ID is sent to location processor 302, which determines whether the location of an individual remote device is in the geo-fence. In one embodiment, location processor 302 generates a geo-polyline location based on the geo-location data that it receives from the remote device and checks whether the geo-polyline is associated with a geo-fence. In one embodiment, this is performed by checking database 340, which maintains a list of all geo-fences set up for each remoted device. More specifically, in one embodiment, location processor 302 examines whether the specific remote has a geo-fence set up for the location in which it has entered or exited. If this is the case, location processor 302 sends an event to policy engine 303.

In one embodiment, policy engine 303 includes a QoS processor 303A that determines whether the service level associated with a service for the remote device for the identified geo-fence needs to be changed. In one embodiment, QoS processor 303A uses rules in QoS rules database 323A to determine whether the rules associated with the remote device for the identified geo-fence need to be changed. In one embodiment, QoS processor also obtains QoS session data from QoS section database 313A. In one embodiment, QoS section database 313A contains list of which remote devices are currently following which policies.

In one embodiment, policy engine 303 includes event processor 303B that determines whether a change in service(s) and/or service level(s) for the remote device based on its location (e.g., whether the remote device is within a geo-fence or has exited a geo-fence) is needed. In one embodiment, event processor 303B determines whether the remote device in question is already consistent with the policy that policy engine 303B wants (e.g., the remote device exits one region into a different region with the same policy). Event processor 303B also determines if any actions are to be triggered based on its current location of the remote device with respect to a geo-fence. If so, event processor 303B examines rules set forth in event rules database 323B to determine whether the current programming of the router of the remote device needs to be updated to reflect a change in service and/or service level based on the geo fence in which the remote device resides. If event processor 303B determines the change in programming of the router for the remote device is necessary, event processor 303B accesses event action database 313B to obtain the set of actions to effectuate the change in router programming and uses action dispatcher 303C to dispatch the actions to policy execution engine 304 for execution thereby.

In one embodiment, policy execution engine 304 includes an alert processor 304A, a reconfiguration processor 304B, and a provision processor 304C. In such a case, in one embodiment, action dispatcher 303C dispatches actions obtained from event action database 313B to alert processor 304A, reconfiguration processor 304B, and provision processor 304C to cause the change in service(s) and/or service level(s).

In one embodiment, alert processor 304A generates an alert for the remote device to notify the remote device that a change in router programming is to be made. In one embodiment, the alert is pushed to the remote device. However, in another embodiment, the remote device pulls the alert from the control system to obtain the notification that a change in service and/or service level needs to be programmed into the remote device. In one embodiment, the remote device performs pull operations to determine if alerts are available at regularly scheduled times.

In one embodiment, reconfiguration processor 304B performs the reconfiguration of the remote device. In one embodiment, reconfiguration processor 304B reconfigures the remote device based on event processor 303B determining that the remote device is in a geo-fence or has left a geo-fence where such entrance or exit warrants a change in configuration. In one embodiment, to perform a reconfiguration of the remote device, reconfiguration processor 304B sets up a new set of rules to update the programming for the router of the remote device. In one embodiment, reconfiguration processor 304B sends the update to the remote device. In another embodiment, the updated programming is downloaded by the remote device.

In one embodiment, provision processor 304C performs provisioning and deprovisioning of communication services, such as, for example, but not limited to, satellite and cellular services and/or service levels. In this case, provision processor 304 accesses and exchanges information with the cellular operator through cellular operator integration adapters (e.g., OSS, BSS, NMS, etc.) 311 and satellite operators via satellite operator integration adapters (e.g., OSS, BSS, NMS, etc.) 310 to perform the provisioning and deprovisioning. In another embodiment, other services include guest Wi-Fi access; preferential use of nearby open Wi-Fi; use of several remote devices as an edge network to proxy traffic among themselves without going over satellite; etc.

Thus, the control system set forth in FIG. 3 provisions remote devices, or other such nodes, in a network dynamically for different services and service levels based on based on geo-location.

Figure 4:
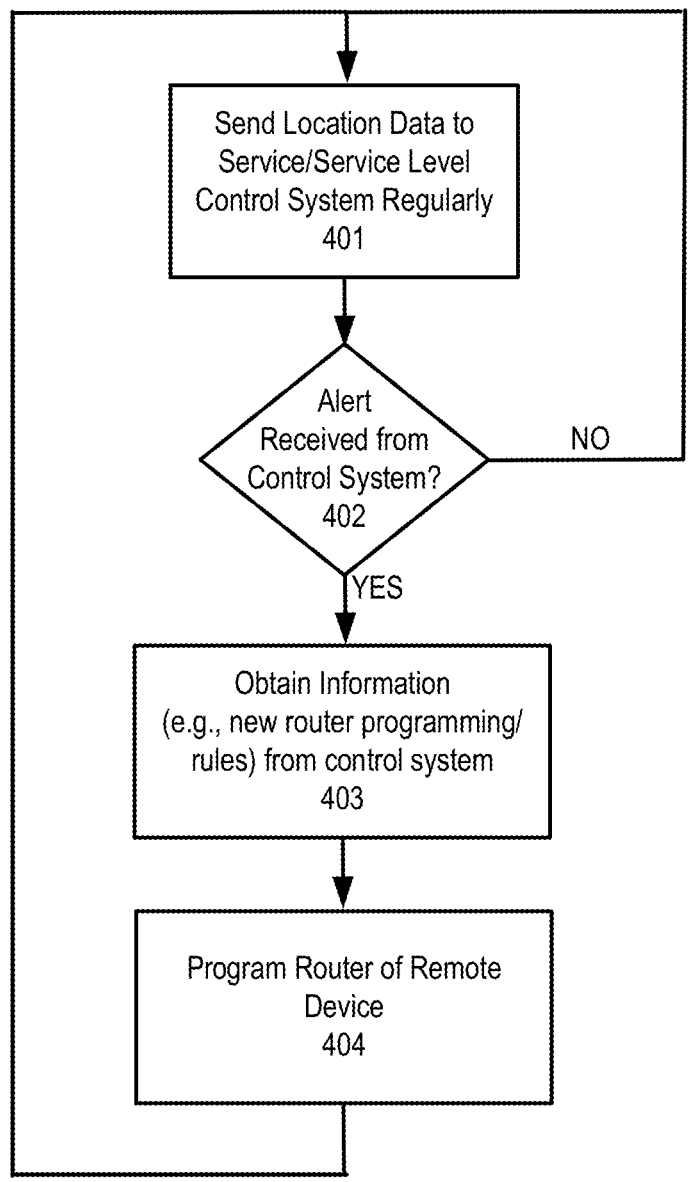
FIG. 4 is a flow diagram of one embodiment of a process for updating a remote device based on its geo-location.

FIG. 4 is a flow diagram of one embodiment of a process for updating a remote device based on its geo-location. The process is performed by processing logic that may comprise hardware (circuitry, dedicated logic, etc.), software (such as is run on a general-purpose computer system or a dedicated machine), or a combination of both.

Referring to FIG. 4, the process begins by the remote device sending location data to a service/service level control system (processing block 401). In one embodiment, the remote device sends location data indicating its geo-location at regularly scheduled times.

Next, while regularly sending its geo-location data, the remote device determines whether an alert has been issued to it from the control system (processing block 402). If not, the process transitions back to processing 401 and the process continues. If an alert was issued by the control system, processing block of the remote device obtains information from the control system (processing block 403). The one embodiment, the information obtained from control system may include new router programming by which the router is to be programmed. The one embodiment, the router program comprises rules by which the remote device is to operate with respect to its service(s) or service level(s).

After obtaining the information from the control system, processing block for the remote device programs its router (processing block 404). In this manner, the remote device's configuration is changed based on the geo-fence in which it currently resides or has recently left.

Figure 5:
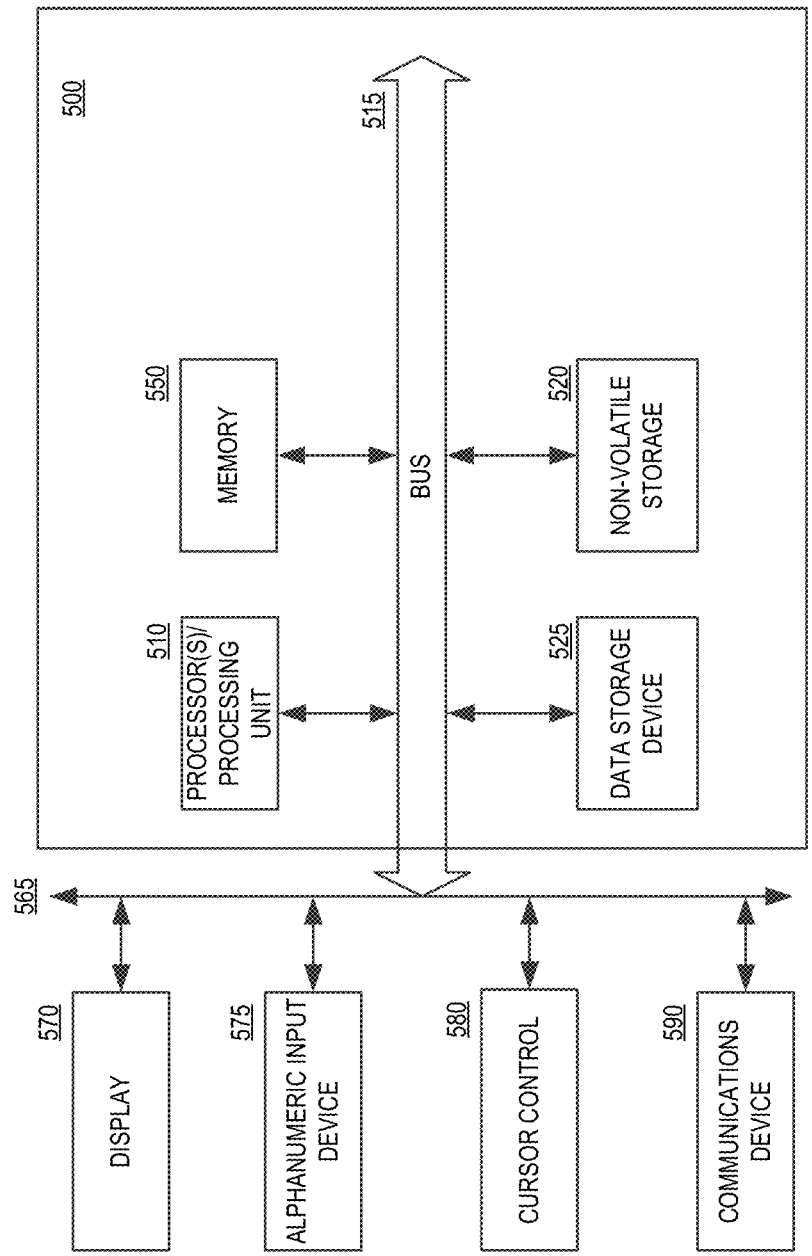
FIG. 5 is a block diagram of one embodiment of a computer system.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and a processor(s) 510 coupled to the bus 515 for processing information. The system further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

In one embodiment, processor(s) 510 executes operations of the policy engine and other operations describe above with respect to changing services and/or service levels and uses its communication device 590 to send the data, instructions, rules or actions, or have them sent, to remote devices and/or communication operators (e.g., satellite operators, cellular operators, other communication network operators, etc.) to effectuate such changes.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in memory 550 or non-volatile memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 565, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

There is a number of example embodiments described herein.

Example 1 is a method comprising: receiving geo-location information from a plurality of remote devices; generating one or more events in response to determining that the geo-location information for each remote device of the plurality of remote devices indicates that said each remote device has entered or exited one of a set of one or more geo-fences; and triggering an action with respect to said each remote device, the action for managing at least one service for said each remote device based on geo-location of the one or more remotes, including determining a level of service and/or type of service for said each remote based on its respective geo-location.

Example 2 is the method of example 1 that may optionally include that managing the at least one service comprises provisioning or deprovisioning the at least one service when said each remote device of the plurality of remote device enters or exits a geo-fence of the one or more geo-fences.

Example 3 is the method of example 1 that may optionally include that the plurality of remote devices are part of a fleet, and wherein managing the at least one service comprises dynamically upgrading the at least one service to prioritize communications for fleet.

Example 4 is the method of example 1 that may optionally include that managing the at least one service comprises managing satellite and cellular services for said each remote device.

Example 5 is the method of example 1 that may optionally include that managing the at least one service comprises generating an alert for said each remote device.

Example 6 is the method of example 5 that may optionally include that the alert comprises an email or text message.

Example 7 is the method of example 5 that may optionally include that said each remote device obtains the alert using a pull operation.

Example 8 is the method of example 5 that may optionally include that said each remote device obtains the alert using a push operation.

Example 9 is the method of example 1 that may optionally include that managing the at least one service comprises calling a web service of another system.

Example 10 is the method of example 1 that may optionally include that managing the at least one service comprises configuring said each remote device based on the geo-fence in which said each remote device resides.

Example 11 is the method of example 10 that may optionally include that configuring said each remote device comprises changing throughput of said each remote device based on the geo-fence in which said each remote device resides.

Example 12 is the method of example 10 that may optionally include that the one or more remote devices are part of a fleet, wherein configuring said each remote device comprises configuring a group of remote devices based on geo-location and membership in a category.

Example 13 is the method of example 12 that may optionally include that the group comprises first responders, police, fire, or emergency personnel.

Example 14 is the method of example 10 that may optionally include that configuring said each remote device comprises controlling provisioning or deprovisioning when said each remote device is actively using a communication service to maintain a call, videoconference or other session-sensitive communication that would otherwise be dropped if the provisioning or deprovisioning occurred.

Example 15 is the method of example 1 that may optionally include that managing the at least one service comprises obtaining different pricing of one or more services of said each remote device based on the geo-fence in which said each remote device resides.

Example 16 is the method of example 1 that may optionally include mapping the geo-location information for each remote device of the plurality of remote devices to a region; determining that the geo-location information for each remote device of the plurality of remote devices indicates that said each remote device is within one geo-fence of the set of one or more geo-fences for which a change in the level of service and/or type of service for said each remote device is to be performed; a policy engine, responsive to one or more geo-location specific policies, geo-sensitive location rules configuring a router of said each remote device or specifying a service or service level for said each remote device based on their geo-sensitive location to change the level of service and/or type of service; generating an alert for said each remote device to notify said each remote device of the update; and sending the update to said each remote device to change the level of service and/or type of service, including sending programming to a local router of the remote to program the remote based on the change in service and/or service level.

Example 17 is the method of example 16 that may optionally include that the level of service and/or type of service comprises ignoring usage limits.

Example 18 is the method of example 16 that may optionally include that the alert includes an informative message to a fleet manager.

Example 19 is a system comprising: a memory to store instructions; one or more processors coupled to the memory to execute the stored instructions to: receive geo-location information from a plurality of remote devices; generate one or more events in response to determining that the geo-location information for each remote device of the plurality of remote devices indicates that said each remote device has entered or excited one of a set of one or more geo-fences; and trigger an action with respect to said each remote device, the action for managing at least one service for said each remote device based on geo-location of the one or more remotes, including determining a level of service and/or type of service for said each remote based on its respective geo-location.

Example 20 is the system of example 19 that may optionally include that the one or more processors are configured to manage the at least one service by provisioning or deprovisioning the at least one service for said each remote when said each remote device of the plurality of remote device enters or exits a geo-fence of the one or more geo-fences.

Example 21 is the system of example 19 that may optionally include that the plurality of remote devices are part of a fleet, and wherein the one or more processors are configured to manage the at least one service by dynamically upgrading the at least service to prioritize communications for fleet.

Example 22 is the system of example 19 that may optionally include that the one or more processors are configured to manage the at least one service by generating an alert for said each remote device that is obtained by said each remote device obtains the alert using a pull operation.

Example 23 is the system of example 19 that may optionally include that the one or more processors are configured to manage the at least one service by configuring said each remote device based on the geo-fence in which said each remote device resides.

Example 24 is the system of example 23 that may optionally include that the one or more processors are configured to configure said each remote device by controlling provisioning or deprovisioning when said each remote device is actively using a communication service to maintain a call, videoconference or other session-sensitive communication that would otherwise be dropped if the provisioning or deprovisioning occurred.

Example 25 is the system of example 19 that may optionally include that the one or more processors are configured to manage the at least one service by obtaining different pricing of one or more services of said each remote device based on the geo-fence in which said each remote device resides.

Example 26 is the system of example 19 that may optionally include that the one or more processors are configured to: map the geo-location information for each remote device of the plurality of remote devices to a region; determine that the geo-location information for each remote device of the plurality of remote devices indicates that said each remote device is within one geo-fence of the set of one or more geo-fences for which a change in the level of service and/or type of service for said each remote device is to be performed; based on one or more geo-sensitive location-based policies, configuring a router of said each remote device or specifying a service or service level for said each remote device based on their geo-sensitive location, the geo-sensitive location rules to change the level of service and/or type of service; generate an alert for said each remote device to notify said each remote device of the update; and send the update to said each remote device via policy execution to change the level of service and/or type of service, including sending programming to a local router of the remote to program the remote based on the change in service and/or service level.

Example 27 is the system of example 19 that may optionally include that the level of service and/or type of service comprises ignoring usage limits.

Example 28 is one or more non-transitory computer readable storage media having instructions stored thereupon which, when executed by a system having at least a processor and a memory therein, cause the system to perform operations comprising: receiving geo-location information from a plurality of remote devices; generating one or more events in response to determining that the geo-location information for each remote device of the plurality of remote devices indicates that said each remote device has entered or excited one of a set of one or more geo-fences; and trigger an action with respect to said each remote device, the action for managing at least one service for said each remote device in response to the action based on geo-location of the one or more remotes, including determining a level of service and/or type of service for said each remote based on its respective geo-location.

Example 29 is the one or more non-transitory computer readable storage media of example 28 that may optionally include that the operations further comprise: mapping the geo-location information for each remote device of the plurality of remote devices to a region; determining that the geo-location information for each remote device of the plurality of remote devices indicates that said each remote device is within one geo-fence of the set of one or more geo-fences for which a change in the level of service and/or type of service for said each remote device is to be performed; a policy engine, response to one or more geo-sensitive location policies, configuring a router of said each remote device or specifying a service or service level for said each remote device based on their geo-sensitive location, the geo-sensitive location rules to change the level of service and/or type of service; generating an alert for said each remote device to notify said each remote device of the update; and sending the update to said each remote device to change the level of service and/or type of service, including sending programming to a local router of the remote to program the remote based on the change in service levels.

Example 30 is the one or more non-transitory computer readable storage media of example 29 that may optionally include that the level of service and/or type of service comprises ignoring usage limits.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    receiving geo-location information from a plurality of remote devices;
    generating one or more events in response to determining that the geo-location information for each remote device of the plurality of remote devices indicates that said each remote device has entered or exited one of a set of one or more geo-fences; and
    triggering an action with respect to said each remote device based on an event of the one or more events, the action for managing at least one wireless communication service for said each remote device based on geo-location of the one or more remote devices, including determining a level of service and/or type of service for said each remote device with respect to the at least one wireless communication service based on its respective geo-location, wherein managing the at least one wireless communication service comprises controlling provisioning or deprovisioning the at least one wireless communication service when said each remote device of the plurality of remote device enters or exits a geo-fence of the one or more geo-fences, including maintaining, when said each remote device is actively using one of the at least one communication service, a call, videoconference or other session-sensitive communication made using the one communication service of the at least one communication service where that call, videoconference or other session-sensitive communication would otherwise be dropped if the provisioning or deprovisioning occurred.

2. The method defined in claim 1 wherein the plurality of remote devices are part of a fleet, and wherein managing the at least one service comprises dynamically upgrading the at least one service to prioritize communications for fleet.

3. The method defined in claim 1 wherein managing the at least one service comprises managing satellite and cellular services for said each remote device.

4. The method defined in claim 1 wherein managing the at least one service comprises generating an alert for said each remote device.

5. The method defined in claim 4 wherein the alert comprises an email or text message.

6. The method defined in claim 4 wherein said each remote device obtains the alert using a pull operation.

7. The method defined in claim 4 wherein said each remote device obtains the alert using a push operation.

8. The method defined in claim 1 wherein managing the at least one service comprises calling a web service of another system.

9. The method defined in claim 1 wherein managing the at least one service comprises configuring said each remote device based on the geo-fence in which said each remote device resides.

10. The method defined in claim 9 wherein configuring said each remote device comprises changing throughput of said each remote device based on the geo-fence in which said each remote device resides.

11. The method defined in claim 9 wherein the one or more remote devices are part of a fleet, wherein configuring said each remote device comprises configuring a group of remote devices based on geo-location and membership in a category.

12. The method defined in claim 11 wherein the group comprises first responders, police, fire, or emergency personnel.

13. The method defined in claim 1 wherein managing the at least one service comprises obtaining different pricing of one or more services of said each remote device based on the geo-fence in which said each remote device resides.

14. The method defined in claim 1 further comprising:
mapping the geo-location information for each remote device of the plurality of remote devices to a region;
determining that the geo-location information for each remote device of the plurality of remote devices indicates that said each remote device is within one geo-fence of the set of one or more geo-fences for which a change in the level of service and/or type of service for said each remote device is to be performed;
a policy engine, responsive to one or more geo-location specific policies, geo-sensitive location rules configuring a router of said each remote device or specifying a service or service level for said each remote device based on their geo-sensitive location to change the level of service and/or type of service;
generating an alert for said each remote device to notify said each remote device of the update; and
sending the update to said each remote device to change the level of service and/or type of service, including sending programming to a local router of the remote to program the remote based on the change in service and/or service level.

15. The method defined in claim 14 wherein the level of service and/or type of service comprises ignoring usage limits.

16. The method defined in claim 14 wherein the alert includes an informative message to a fleet manager.

17. A system comprising:
a memory to store instructions;
one or more processors coupled to the memory to execute the stored instructions to:
receive geo-location information from a plurality of remote devices;
generate one or more events in response to determining that the geo-location information for each remote device of the plurality of remote devices indicates that said each remote device has entered or excited one of a set of one or more geo-fences; and
trigger an action with respect to said each remote device based on an event of the one or more events, the action for managing at least one wireless communication service for said each remote device based on geo-location of the one or more remote devices, including determining a level of service and/or type of service for said each remote device with respect to the at least one wireless communication service based on its respective geo-location, wherein managing the at least one wireless communication service comprises controlling provisioning or deprovisioning the at least one wireless communication service when said each remote device of the plurality of remote device enters or exits a geo-fence of the one or more geo-fences, including maintaining, when said each remote device is actively using one of the at least one communication service, a call, videoconference or other session-sensitive communication made using the one communication service of the at least one communication service where that call, videoconference or other session-sensitive communication would otherwise be dropped if the provisioning or deprovisioning occurred.

18. The system defined in claim 17 wherein the plurality of remote devices are part of a fleet, and wherein the one or more processors are configured to manage the at least one service by dynamically upgrading the at least service to prioritize communications for fleet.

19. The system defined in claim 17 wherein the one or more processors are configured to manage the at least one service by generating an alert for said each remote device that is obtained by said each remote device obtains the alert using a pull operation.

20. The system defined in claim 17 wherein the one or more processors are configured to manage the at least one service by configuring said each remote device based on the geo-fence in which said each remote device resides.

21. The system defined in claim 17 wherein the one or more processors are configured to manage the at least one service by obtaining different pricing of one or more services of said each remote device based on the geo-fence in which said each remote device resides.

22. The system defined in claim 17 wherein the one or more processors are configured to:
map the geo-location information for each remote device of the plurality of remote devices to a region;
determine that the geo-location information for each remote device of the plurality of remote devices indicates that said each remote device is within one geo-fence of the set of one or more geo-fences for which a change in the level of service and/or type of service for said each remote device is to be performed;
based on one or more geo-sensitive location-based policies, configuring a router of said each remote device or specifying a service or service level for said each remote device based on their geo-sensitive location, the geo-sensitive location rules to change the level of service and/or type of service;
generate an alert for said each remote device to notify said each remote device of the update; and send the update to said each remote device via policy execution to change the level of service and/or type of service, including sending programming to a local router of the remote to program the remote based on the change in service and/or service level.

23. The system defined in claim 17 wherein the level of service and/or type of service comprises ignoring usage limits.

24. One or more non-transitory computer readable storage media having instructions stored thereupon which, when executed by a system having at least a processor and a memory therein, cause the system to perform operations comprising:
  receiving geo-location information from a plurality of remote devices;
  generating one or more events in response to determining that the geo-location information for each remote device of the plurality of remote devices indicates that said each remote device has entered or excited one of a set of one or more geo-fences; and
  trigger an action with respect to said each remote device based on an event of the one or more events, the action for managing at least one wireless communication service for said each remote device based on geo-location of the one or more remote devices, including determining a level of service and/or type of service for said each remote device with respect to the at least one wireless communication service based on its respective geo-location, wherein managing the at least one wireless communication service comprises controlling provisioning or deprovisioning the at least one wireless communication service when said each remote device of the plurality of remote device enters or exits a geo-fence of the one or more geo-fences, including maintaining, when said each remote device is actively using one of the at least one communication service, a call, videoconference or other session-sensitive communication made using the at least one communication service where that call, videoconference or other session-sensitive communication would otherwise be dropped if the provisioning or deprovisioning occurred.

25. The one or more non-transitory computer readable storage media defined in claim 24 wherein the operations further comprise:
  mapping the geo-location information for each remote device of the plurality of remote devices to a region;
  determining that the geo-location information for each remote device of the plurality of remote devices indicates that said each remote device is within one geo-fence of the set of one or more geo-fences for which a change in the level of service and/or type of service for said each remote device is to be performed;
  a policy engine, response to one or more geo-sensitive location policies, configuring a router of said each remote device or specifying a service or service level for said each remote device based on their geo-sensitive location, the geo-sensitive location rules to change the level of service and/or type of service;
  generating an alert for said each remote device to notify said each remote device of the update; and
  sending the update to said each remote device to change the level of service and/or type of service, including sending programming to a local router of the remote to program the remote based on the change in service levels.

26. The one or more non-transitory computer readable storage media defined in claim 25 wherein the level of service and/or type of service comprises ignoring usage limits.

* * * * *